United States Patent
Sameshima et al.

(10) Patent No.: US 9,625,308 B2
(45) Date of Patent: Apr. 18, 2017

(54) VIBRATION ENERGY DETECTION APPARATUS AND VIBRATION ENERGY DETECTION SYSTEM

(71) Applicant: OMRON Corporation, Kyoto-shi, Kyoto (JP)

(72) Inventors: Hiroshi Sameshima, Nara (JP); Misato Nabeto, Nara (JP); Masayo Ikuta, Kyoto (JP); Kenji Sakurai, Kyoto (JP)

(73) Assignee: OMRON Corporation, Kyoto (JP)

( * ) Notice: Subject to any disclaimer, the term of this patent is extended or adjusted under 35 U.S.C. 154(b) by 378 days.

(21) Appl. No.: 14/390,457

(22) PCT Filed: Feb. 8, 2013

(86) PCT No.: PCT/JP2013/053155
§ 371 (c)(1),
(2) Date: Oct. 3, 2014

(87) PCT Pub. No.: WO2013/153845
PCT Pub. Date: Oct. 17, 2013

(65) Prior Publication Data
US 2015/0168208 A1    Jun. 18, 2015

(30) Foreign Application Priority Data
Apr. 10, 2012  (JP) ................. 2012-089542

(51) Int. Cl.
*H02N 1/00*   (2006.01)
*G01B 17/00*  (2006.01)
(Continued)

(52) U.S. Cl.
CPC .......... *G01H 17/00* (2013.01); *G01M 5/0008* (2013.01); *G01M 5/0066* (2013.01); *G01M 7/00* (2013.01)

(58) Field of Classification Search
CPC .......... H02N 2/18; H02N 2/181; H02N 2/186; H01L 41/042; H01L 41/113; H01L 41/1132
(Continued)

(56) References Cited

U.S. PATENT DOCUMENTS 7,081,693 B2 * 7/2006 Hamel ................ B60C 23/0411
307/151
2011/0057812 A1 * 3/2011 Matsuda .............. G05B 19/406
340/870.07
(Continued)

FOREIGN PATENT DOCUMENTS

| JP | 2006-284607 A | 10/2006 |
| JP | 2009-284240 A | 12/2009 |
| JP | 2011-221002 A | 11/2011 |

OTHER PUBLICATIONS

International Search Report issued in PCT/JP2013/053155 mailed on May 14, 2013 (4 pages).

*Primary Examiner* — Thomas Dougherty
(74) *Attorney, Agent, or Firm* — Osha Liang LLP

(57) ABSTRACT

A vibration energy detection apparatus has a vibration power generator installed in an inspection object that converts vibration energy generated in the inspection object into power, an electric storage unit that stores generated power of the vibration power generator, a voltage monitor that monitors a storage voltage of the electric storage unit, a discharge controller that discharges electric storage energy of the electric storage unit when the storage voltage of the electric storage unit exceeds a predetermined storage voltage, and a vibration energy calculator that calculates the vibration energy generated in the inspection object based on the number of formation times of an electric storage state of the
(Continued)

electric storage unit. The electric storage state is continuously or intermittently formed by the discharge by the discharge controller.

20 Claims, 4 Drawing Sheets

(51) Int. Cl.
*G01H 17/00* (2006.01)
*G01M 5/00* (2006.01)
*G01M 7/00* (2006.01)

(58) Field of Classification Search
USPC .......... 310/309, 316.02, 318, 339; 73/432.1, 73/584, 594, 609, 724
See application file for complete search history.

(56) References Cited

U.S. PATENT DOCUMENTS

| | | | |
|---|---|---|---|
| 2012/0318056 A1 | 12/2012 | Izumi et al. | |
| 2014/0306672 A1* | 10/2014 | Bellala | G05F 1/56 323/266 |
| 2016/0209454 A1* | 7/2016 | McCammon | G01R 31/021 |

\* cited by examiner

VIBRATION ENERGY DETECTION APPARATUS AND VIBRATION ENERGY DETECTION SYSTEM

BACKGROUND

Technical Field

The present invention relates to an apparatus and a system for detecting vibration energy generated in an inspection object.

Related Art

Nowadays, daily-available environmental energy independent of fossil fuel attracts attention from the viewpoint of energy saving. Electric energy generated by sunlight or wind power is well known as the environmental energy, and daily-available vibration energy can also be cited as the environmental energy having the same energy density as the electric energy generated by the sunlight or wind power. A vibration power generator that generates the power using the vibration energy has been developed, and an electret that can semipermanently retain a charge is widely used in the vibration power generator (for example, see Patent Document 1). In the technology of the vibration power generator in which the electret is used, a movement direction of a movable board that moves reciprocally for the power generation is set to at least two directions different from each other. Therefore, an external vibration is efficiently collected into the vibration power generator to be able to power the generation.

Patent Document 2 discloses an example of a usage form of the vibration power generator. Patent Document 2 discloses a technology concerning the vibration power generator provided in a wrist watch. In the technology, power consumption mode of the wrist watch is switched according to whether the vibration power generator generates the power by the vibration.

On the other hand, the vibration power generator is installed in an inspection object to act as a vibration sensor that directly converts a displacement of the vibration generated in the inspection object into an electric signal. The vibration displacement can be obtained by performing electric processing (double integral) of acceleration detected by an acceleration sensor. However, the vibration detected with the vibration power generator is a useful technique because the power is required for the electric processing. Patent Document 3 discloses a technology of producing vibration information or acceleration information by counting the number of vibrations of an AC voltage generated from the vibration power generator with a counter circuit.

PATENT DOCUMENTS

Patent Document 1: Japanese Unexamined Patent Publication No. 2009-284240

Patent Document 2: Japanese Unexamined Patent Publication No. 2006-284607

Patent Document 3: Japanese Unexamined Patent Publication No. 2011-221002

SUMMARY

In the case that the vibration power generator is used as the vibration sensor, vibration energy generated in the inspection object in which the vibration power generator is installed can be understood by correlating the energy of the generated power of the vibration power generator with vibration energy. Therefore, in the conventional technology, the generated power of the vibration power generator is stored in a power storage device such as a capacitor, and the vibration energy is calculated from electric storage energy of the power storage device. However, because the power storage device generally has a leakage current characteristic as an inevitable physical characteristic, the energy accumulated in the power storage device tends to decrease due to a leakage current of the power storage device. Therefore, in the conventional technology, it is difficult to correctly understand the vibration energy based on the electric storage energy of the power storage device.

Depending on a situation in which the inspection object is placed, sometimes the frequency of the vibration generated in the inspection object is extremely low. In such cases, because of a high ratio of a discharge amount by the leakage current of the power storage device to a charge amount of the power storage device by the vibration power generator that is of the vibration sensor, it is difficult to correctly understand the vibration energy based on the electric storage energy of the power storage device.

One or more embodiments of the present invention provides a vibration energy detection apparatus or system that can use the vibration power generator to correctly detect the vibration energy generated in the inspection object.

According to one or more embodiments of the present invention, the vibration energy generated in the inspection object is calculated based on the number of formation times (formation frequency) of the electric storage state of the electric storage unit, the electric storage state being formed by the discharge of the electric storage energy of the electric storage unit. By combining the vibration energy with the number of formation times of the electric storage state formed by the discharge of the electric storage energy of the electric storage unit, an influence of the leakage current that is possibly always generated can be relaxed to properly calculate the vibration energy.

Particularly, according to one or more embodiments of the invention, a vibration energy detection apparatus includes: a vibration power generator that is installed in an inspection' object and is configured to convert vibration energy generated in the inspection object into power; an electric storage unit configured to store generated power of the vibration power generator; a voltage monitor configured to monitor a storage voltage of the electric storage unit; a discharge controller configured to discharge electric storage energy of the electric storage unit when the storage voltage of the electric storage unit exceeds a predetermined storage voltage; and a vibration energy calculator configured to calculate the vibration energy generated in the inspection object based on the number of formation times of an electric storage state of the electric storage unit, the electric storage state being continuously or intermittently formed by the discharge by the discharge controller.

In the configuration of the vibration energy detection apparatus of the invention, the generated power of the vibration power generator is stored in the electric storage unit. As to the electric storage unit, an amount of energy stored in the electric storage unit is referred to as an electric storage capacity, and distinguished from an electrostatic capacity of the electric storage unit. Examples of the electric storage unit include an aluminum electrolytic capacitor, an electric double layer capacitor, and a lithium ion capacitor. When the generated power of the vibration power generator is stored in the electric storage unit, the storage voltage of the electric storage unit increases while an electric storage margin of the electric storage unit decreases. The voltage monitor monitors the storage voltage of the electric storage unit, and the discharge controller causes discharge of the electric storage energy of the electric storage unit when the storage voltage exceeds the predetermined storage voltage, namely, when the storage voltage exceeds the predetermined storage voltage that is set by reflecting the electric storage capacity of the electric storage unit. As a result, the electric storage unit can be recharged with the generated power of the vibration power generator.

Generally, in the electric storage unit, there is a leakage current characteristic in which the electric storage energy in the electric storage unit leaks to the outside. Therefore, desirably an influence of the leakage current characteristic of the electric storage unit is maximally removed when the generated power of the vibration power generator is stored in the electric storage unit to calculate the vibration energy. In the vibration energy detection apparatus of the invention, the vibration energy calculator calculates the vibration energy generated in the inspection object based on the number of formation times of the electric storage state of the electric storage unit, the electric storage state being continuously or intermittently formed by the discharge by the discharge controller, namely, the number of times (or frequency) of an predetermined state (electric storage state) that is formed in the electric storage unit by the discharge repeatedly performed by the discharge controller.

As described above, the discharge controller causes discharge of the electric storage unit when the storage voltage of the electric storage unit exceeds the predetermined storage voltage, so that an amount of energy stored in the electric storage unit at that time can be understood. In principle, by taking into account the number of formation times in the calculation of the vibration energy, time for which the electric storage energy is continuously stored in the electric storage unit is divided. Therefore, the influence of the leakage current characteristic of the electric storage unit is maximally constrained in each formation time. Accordingly, in the vibration energy detection apparatus of the invention, in calculating the vibration energy, the vibration energy generated in the inspection object can properly be calculated by taking into account the electric storage energy (that is, energy emitted per discharge) in which the influence of the leakage current is maximally constrained and the number of formation times.

In the vibration energy detection apparatus, according to one or more embodiments of the present invention, the electric storage unit has a predetermined leakage current characteristic that is set based on a power generation frequency and a power generation amount of the vibration power generator. Generally, the electric storage unit has a characteristic in which a leakage current amount increases with increasing electrostatic capacity of the electric storage unit. On the other hand, as described later, the discharge controller causes discharge of the electric storage energy accumulated in the electric storage unit, a discharge frequency increases with decreasing electric storage capacity of the electric storage unit, and power consumption necessary for discharge control increases. Therefore, according to one or more embodiments of the present invention, the electric storage capacity of the electric storage unit is set such that the excessive discharge frequency is avoided while the leakage current amount is properly constrained, and a leakage current characteristic according to the set electric storage capacity serves as the predetermined leakage current characteristic.

In the vibration energy detection apparatus, the vibration energy calculator may calculate the vibration energy generated in the inspection object based on the number of formation times of a discharge state formed by discharge by the discharge controller. The number of formation times of the discharge state is the number of formation times of the state in which the discharge controller causes discharge of the energy of the electric storage unit. In other words, the number of formation times of the discharge state is said to be the discharge frequency of the discharge controller. Thus, the influence of the leakage current characteristic of the electric storage unit is maximally removed by calculating the vibration energy according to the discharge frequency, and therefore calculation accuracy can be improved.

In the vibration energy detection apparatus, the vibration energy calculator may calculate the vibration energy generated in the inspection object based on the number of formation times of a charge state of the electric storage unit, the charge state being formed by charging the electric storage unit with the vibration energy after the discharge by the discharge controller and by arrival of the storage voltage of the electric storage unit at the predetermined storage voltage. Because the charge state is continuously or intermittently formed by the discharge by the discharge controller, the number of formation times of the charge state corresponds to the number of formation times of the electric storage state formed due to the discharge by the discharge controller, and has some sort of correlation with the discharge frequency of the discharge controller. Accordingly, the influence of the leakage current characteristic of the electric storage unit is maximally removed by calculating the vibration energy according to the number of formation times of the charge state, and therefore the calculation accuracy can be improved.

The vibration energy detection apparatus may include the electric storage unit in plural, the electric storage units that are connected in parallel to the vibration power generator such that the generated power of the vibration power generator can be stored in each of the plurality of electric storage units. In the vibration energy detection apparatus, the generated power of the vibration power generator may be supplied to another electric storage unit except one of the plurality of electric storage units when the one of the plurality of electric storage units is discharged by the discharge controller. When the plurality of electric storage units are connected to the vibration power generator, even if the discharge controller causes discharge of the electric storage unit, the generated power of the vibration power generator can be stored in the electric storage unit except the currently-discharging electric storage unit, and the energy concerning the vibration of the inspection object can be accumulated in the electric storage unit with no omission. Therefore, the calculation accuracy can be improved based on the number of formation times of the electric storage state of the electric storage unit.

According to one or more embodiments of the invention, a vibration energy detection system for detecting vibration energy generated in an inspection object includes: a sensor module that is installed in the inspection object and is configured to obtain information on vibration applied to the inspection object; and a server configured to calculate the vibration energy generated in the inspection object based on the information obtained by the sensor module. In the vibration energy detection system, the sensor module includes: a vibration power generator that is installed in the inspection object and is configured to convert the vibration energy generated in the inspection object into power; an electric storage unit configured to store generated power of the vibration power generator; a voltage monitor configured to monitor a storage voltage of the electric storage unit; a discharge controller configured to discharge electric storage energy of the electric storage unit when the storage voltage of the electric storage unit exceeds a predetermined storage voltage; a detector configured to detect the number of formation times of an electric storage state of the electric storage unit, the electric storage state being continuously or intermittently formed by the discharge by the discharge controller; and a transmitter configured to transmit data concerning the number of formation times of the electric storage state to the server, the number of formation times of the electric storage state being detected by the detector, and the server includes: a receiver configured to receive the data concerning the number of formation times of the electric storage state, the data concerning the number of formation times of the electric storage state being transmitted from the transmitter; and a vibration energy calculator configured to calculate the vibration energy generated in the inspection object based on the data concerning the number of formation times of the electric storage state, the data concerning the electric storage state being received by the receiver.

That is, in the vibration energy detection system of one or more embodiments of the invention, the sensor module acquires the information on the vibration of the inspection object, and transmits the information to the server. The transmission and the reception of the information between the sensor module and the server may be performed in a wired or wireless manner, and the transmission and the reception of the information are performed between the transmitter of the sensor module and the receiver of the server. Because technical thoughts concerning the vibration power generator, the electric storage unit, the voltage monitor, and the discharge controller in the vibration energy detection system of one or more embodiments of the invention are substantially identical to technical thoughts concerning the components in the vibration energy detection apparatus, the detailed description is neglected. Because the technical thoughts concerning the detector on the sensor module side and the vibration energy calculator on the server side are included in the technical thought concerning the vibration energy calculator of the vibration energy detection apparatus, the detailed description is neglected.

In the vibration energy detection system, the vibration energy calculator may calculate the vibration energy generated in the inspection object based on the number of formation times of a discharge state formed by discharge by the discharge controller, and the vibration energy calculator may calculate the vibration energy generated in the inspection object based on the number of formation times of a charge state of the electric storage unit, the charge state being formed by charging the electric storage unit with the vibration energy after the discharge by the discharge controller and by arrival of the storage voltage of the electric storage unit at the predetermined storage voltage.

In the vibration energy detection system, the sensor module may include the electric storage unit in plural. In this case, the plurality of electric storage units may be connected in parallel to the vibration power generator such that the generated power of the vibration power generator can be stored in each of the plurality of electric storage units, and the generated power of the vibration power generator may be supplied to another electric storage unit except one of the plurality of electric storage units when the one of the plurality of electric storage units is discharged by the discharge controller.

Thus, in the vibration energy detection system of one or more embodiments of the invention, the vibration energy generated in the inspection object can also properly be calculated. In the vibration energy detection system of one or more embodiments of the invention, the plurality of sensor modules are installed with respect to the same inspection object, and pieces of information on the vibration may be integrated into the server.

According to one or more embodiments of the present invention, the vibration energy generated in the inspection object can correctly be detected using the vibration power generator.

DETAILED DESCRIPTION

Hereinafter, embodiments of the invention will be described with reference to the drawings. The following embodiments are only examples, and the invention is not limited to the below embodiments. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
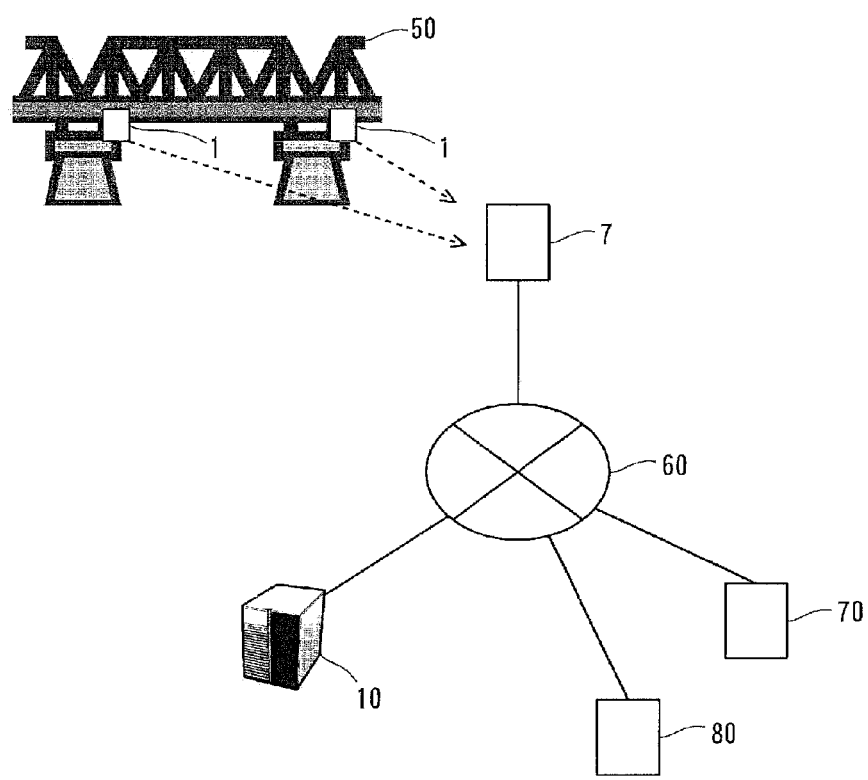
FIG. 1 is a view of a schematic configuration of a vibration energy detection system according to one or more embodiments of the invention.

Using the vibration sensor module 1 installed on a bridge 50, a vibration energy detection system in FIG. 1 detects vibration energy applied to the bridge 50. Generally, it is necessary to properly understand a change in performance of the bridge 50 because the performance such as strength degrades as time passes. For example, because an amplitude (vibration displacement) or a vibration frequency of the bridge 50 changes according to the progress of degradation of the bridge 50 by an earthquake or repeated passage of large vehicles, desirably the change of the amplitude or vibration frequency is monitored to effectively maintain the bridge 50. Therefore, a plurality of vibration sensor modules that can directly detect the displacement caused by the vibration are installed in the bridge 50 in the vibration energy detection system in FIG. 1. Information (hereinafter also referred to as "vibration information") on the vibration of the bridge 50 is detected by the vibration sensor module 1 and transmitted to a base station 7. The base station 7 is connected to the Internet 60, and the received vibration information on the vibration of the bridge 50 is transmitted to a server 10 through the Internet 60.

Using the vibration information obtained from the vibration sensor module 1, the server 10 correctly understand a state of the vibration applied to the bridge 50, and performs processing of determining the strength of the bridge 50 (for example, determination of a level of degree in strength deterioration). The server 10 can also obtain other pieces of information (such as meteorological data of an area where the bridge 50 exists and traffic load data of the bridge 50) necessary for the determination from data servers 70 and 80 connected to the Internet 60.

Figure 2:
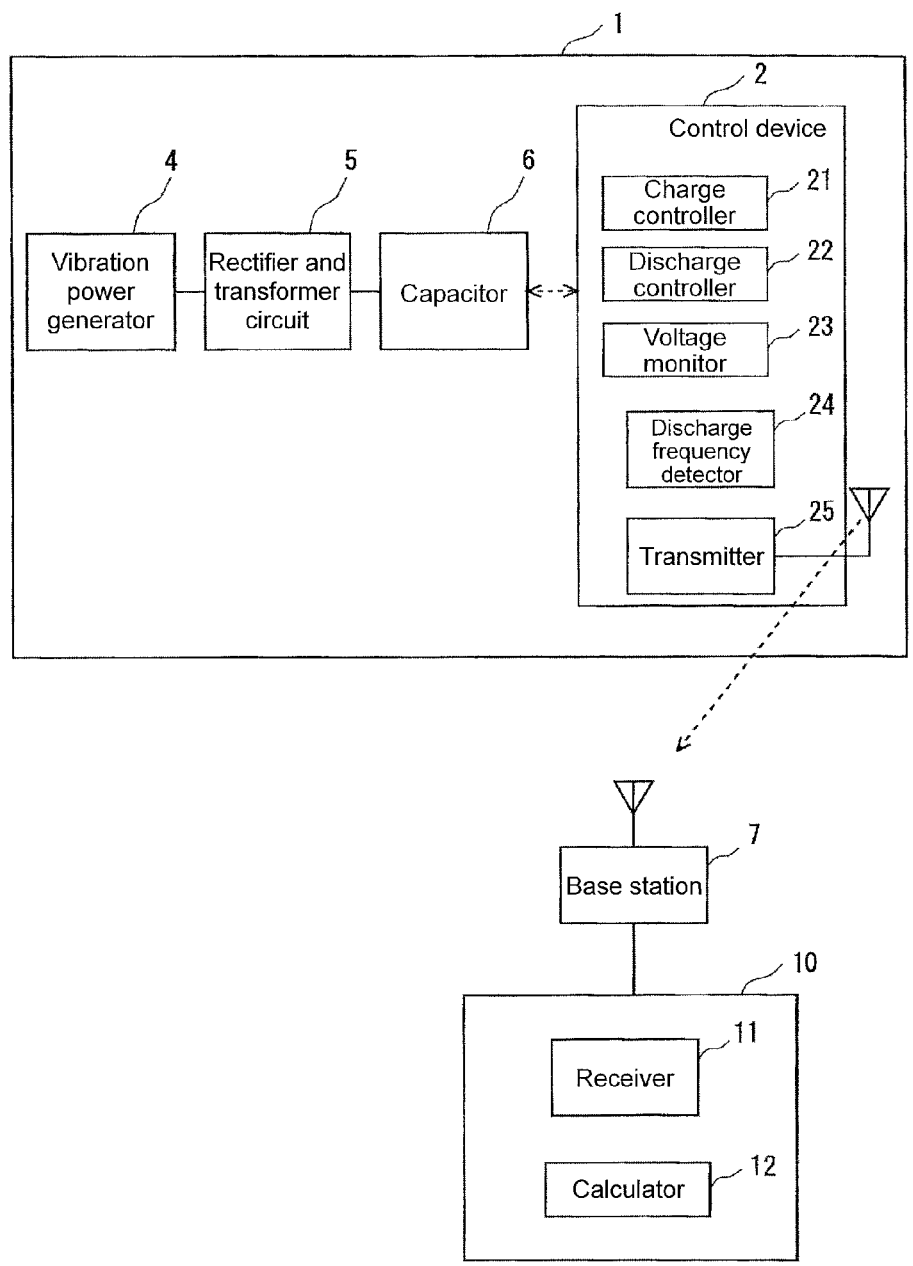
FIG. 2 is a diagram illustrating a schematic configuration of a vibration sensor module in FIG. 1.

FIG. 2 illustrates a functional block in which functions exerted by the vibration sensor module 1 and the server 10 are imaged. A vibration power generator 4 is provided in the vibration sensor module 1. The vibration power generator 4 can output the vibration applied to the bridge 50, namely, the displacement of the vibration propagating to the vibration sensor module 1 through the bridge 50 as an electric signal. The vibration power generator 4 acts as a power supply in which what is called an environmental energy is used, and a power generator in which an electret material is used can be cited as an example of the vibration power generator 4. Because the vibration power generator is well known, the detailed description is neglected. Generated power of the vibration power generator 4 is accumulated in a capacitor 6 that is of the power storage device through a rectifier and transformer circuit 5. In the vibration sensor module 1, the plurality of capacitors 6 are installed, and each capacitor 6 is connected to the vibration power generator 4 in parallel such that the generated power of the vibration power generator 4 can be stored.

In one or more embodiments of the present invention, as described later, energy stored in the capacitor is dealt with as one concerning the vibration energy generated in the bridge 50. In other words, the energy stored in the capacitor is used as a parameter in order to detect the vibration energy. Accordingly, although electric storage energy of the capacitor 6 is not directly used as the energy driving each component of the vibration sensor module 1, the electric storage energy of the capacitor 6 may be used as driving energy of the vibration sensor module 1 after the vibration energy detection processing (to be described later). Power generators other than the vibration power generator (for example, a solar power generator, a thermal power generator, an electromagnetic induction power generator (CT power generator), and a biological power generator) may be installed in the vibration sensor module 1, and the power of the power generators other than the vibration power generator may be used as a power supply. Because the power generators other than the vibration power generator are well known, the detailed description is neglected. Because the rectifier and transformer circuit is also well known, the detailed description is neglected.

In the vibration sensor module 1 having the above configuration, a power generation operation of the vibration power generator 4 is used to detect the vibration energy applied to the bridge 50. In the configuration in FIG. 2, only the vibration power generator is provided as the senor detecting an environmental parameter concerning the vibration. Alternatively, in addition to the vibration power generator, an acceleration sensor detecting acceleration applied to the bridge 50 may be included in the vibration sensor module 1.

In the vibration sensor module 1, a control device 2 performs the vibration energy detection processing in which the electric storage energy of the capacitor 6 is used. The vibration energy detection processing is performed by a charge controller 21, a discharge controller 22, a voltage monitor 23, a discharge frequency detector 24, and a transmitter 25, which are included in the control device 2. The functions exerted by these functional units may be implemented by a control circuit that is provided in the control device 2 to correspond to each function. Alternatively, when the control device 2 is a computer, the functions may be implemented by a control program executed on the computer, or implemented by cooperation between the control circuit and the control program. The control device 2 may include a functional unit other than the functional units in FIG. 1.

The charge controller 21 performs control concerning charge of the capacitor 6. As described above, in the vibration sensor module 1, the plurality of capacitors 6 are connected in parallel with the vibration power generator 4. The charge controller 21 performs the control concerning the charge of the generated power, for example, concerning which one of the capacitors 6 the generated power of the vibration power generator is charged into. On the other hand, the discharge controller 22 performs control concerning discharge of the power stored in the capacitor 6 in order to detect the vibration energy applied to the bridge 50. The voltage monitor 23 monitors a storage voltage of the capacitor 6 in order to perform the charge control of the charge controller 21 and the discharge control of the discharge controller 22 at proper timing. The discharge controller 22 causes discharge of the capacitor 6 when the storage voltage of the capacitor 6, which is monitored by the voltage monitor 23, arrives at a predetermined storage voltage (discharge threshold).

The discharge frequency detector 24 detects, namely, counts the number of discharges (discharge frequency) of the capacitor 6. The discharge of the capacitor 6 is performed by the discharge controller 22. Capacitor 6 in which the vibration energy of the bridge 50 is stored as the power generation energy, namely, all the capacitors 6 included in the vibration sensor module 1 are counting targets of the discharge frequency detector 24. The transmitter 25 transmits information on the vibration obtained by the vibration sensor module 1 to the server 10 through the base station 7 by wireless communication. The information includes the discharge frequency detected by the discharge frequency detector 24. There is no particular limitation to a communication system of the wireless communication. For example, according to one or more embodiments of the present invention, a low-power-consumption communication system pursuant to standard ZigBee (registered trademark) is adopted. For the sake of convenience, these functional units are distinguished from one another as illustrated in FIG. 1. Specifically, the functional units may be integrated or segmentalized as long as the functions are exerted.

Figure 3:
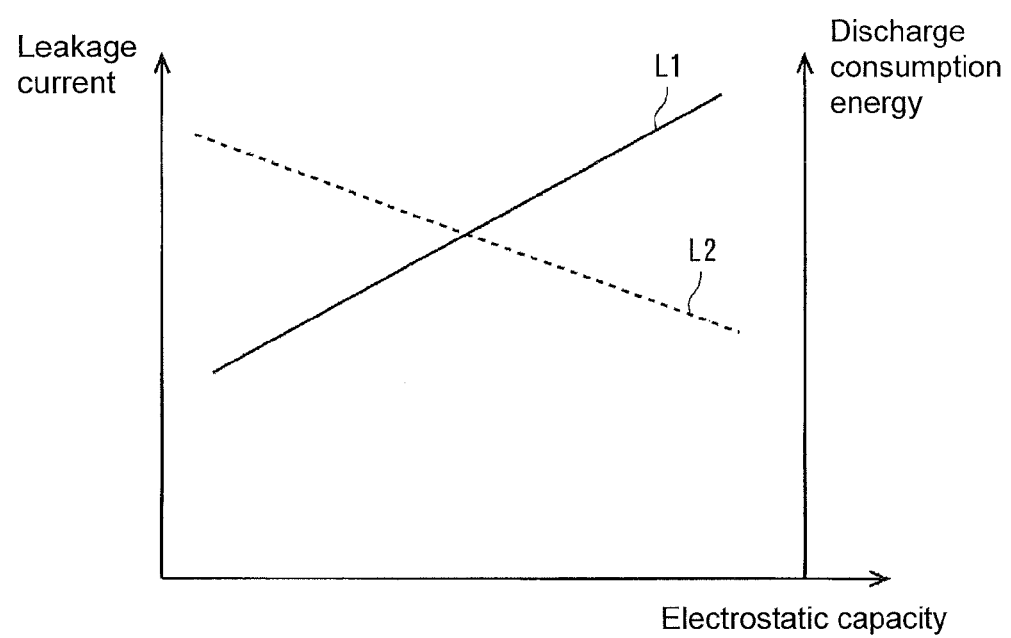
FIG. 3 is a diagram illustrating, with respect to a capacitor included in the vibration sensor module in FIG. 1, a correlation between an electrostatic capacity and a leakage current and a correlation between the electrostatic capacity and a total amount of consumption energy necessary for discharge of the capacitor.

Any capacitor (such as an electric double layer capacitor) can be used as the capacitor 6 as long as the generated power of the vibration power generator 4 is stored. A general capacitor has a leakage current characteristic as a physical characteristic. As indicated by a solid line L1 in FIG. 3, it is found that a leakage current amount tends to increase with increasing electrostatic capacity of the capacitor. The increase in leakage current means that the storage of the generated power of the vibration power generator 4 is disturbed. Therefore, with increasing leakage current of the capacitor, it becomes difficult to correctly understand the vibration energy based on the electric storage energy.

In one or more embodiments of the present invention, as described above, the vibration energy applied to the bridge 50 is correctly detected based on the discharge frequency detected by the discharge frequency detector 24. At this point, according to one or more embodiments of the present invention, the electrostatic capacity of the capacitor 6 is decreased in order to remove an influence of the leakage current as much as possible. On the other hand, the capacitor 6 is caused to discharge to put the electric storage state of the capacitor 6 into a discharge state (a state in which the electric storage energy is minimized by the discharge), and the discharge frequency is counted. Because an energy amount (electric storage capacity) that can be stored in the capacitor 6 decreases when the electrostatic capacity of the capacitor 6 decreases, the discharge frequency increases compared with a case that the large amount of energy is stored in the capacitor 6, and the energy necessary for a discharge treatment, namely, the consumption energy necessary for the discharge treatment of the discharge controller 22 increases (see a transition of discharge consumption energy relative to the electrostatic capacity, the transition being indicated by a dotted line L2 in FIG. 3).

Therefore, in one or more embodiments of the present invention, based on an assumed vibration frequency at the bridge 50, namely, a power generation frequency of the vibration power generator 4 or power generation performance of the vibration power generator 4, while the leakage current is maximally decreased, the capacitor 6 is set to have the electrostatic capacity in which the electric storage capacity can be secured such that the discharge frequency of the discharge controller 22 is not excessively increased. For example, a capacitor having an electrostatic capacity corresponding to an intersection between lines L1 and L2 in FIG. 3 may be selected as the capacitor 6, or a capacitor having a smaller electrostatic capacity may be selected as the capacitor 6 for low necessity to apprehend the power consumption of the vibration sensor module 1.

Then, in the server 10, processing of calculating the vibration energy of the bridge 50 is performed based on the information on the vibration transmitted from the vibration sensor module 1. A receiver 11 and a calculator 12, which are formed in the server 10, perform the vibration energy calculation processing. The receiver 11 is a functional unit that receives the information transmitted by the transmitter 25 of the vibration sensor module 1. Accordingly, the communication system of the receiver 11 is identical to the communication system of the transmitter 25. The calculator 12 is a functional unit that calculates the vibration energy generated in the bridge 50 based on the information received by the receiver 11.

Figure 4:
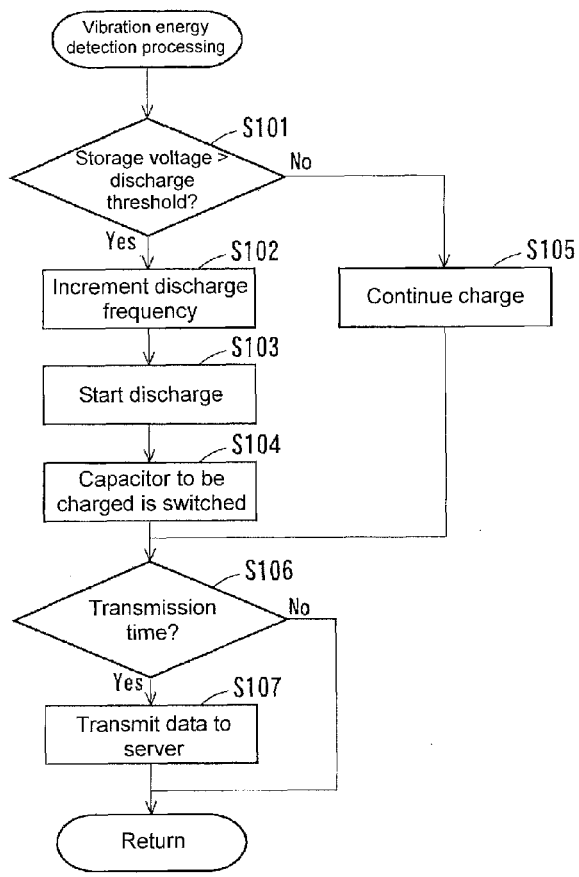
FIG. 4 is a flowchart of vibration energy detection processing performed in the vibration sensor module in FIG. 1.
Figure 5:
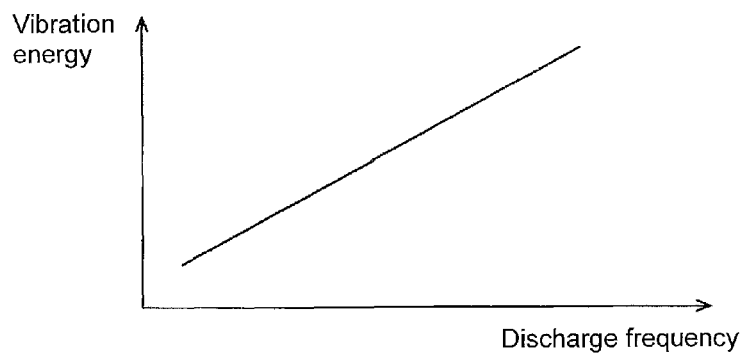
FIG. 5 is a control map, which is used in vibration energy calculation performed by a server in FIG. 1, illustrating a correlation between a discharge frequency and vibration energy.

The vibration energy detection processing and the vibration energy calculation processing, which are performed by the vibration sensor module 1 and the server 10, will be described with reference to FIGS. 4 and 5. The vibration energy detection processing in FIG. 4 is performed in one vibration sensor module, and the vibration energy detection processing is performed at each time of the vibration sensor module 1. FIG. 5 is a control map, which is used in the vibration energy calculation performed by the server 10, illustrating a correlation between the discharge frequency and the vibration energy.

In S101, whether the storage voltage of the capacitor 6 monitored by the voltage monitor 23 is larger than a discharge threshold is determined. In the plurality of capacitors 6 included in the vibration sensor module 1, the capacitor 6 to be determined is one that is charged by the generated power of the vibration power generator 4. The flow goes to S102 when the affirmative determination is made in S101, and the flow goes to S105 when the negative determination is made in S101.

Processing concerning the discharge of the capacitor 6 in which the storage voltage is determined to be larger than the discharge threshold is performed in S102 to S104. In S102, increment processing (processing of incrementing the "discharge frequency" by "1") is performed to the "discharge frequency" that is of the parameter used in the vibration energy calculation processing on the side of the server 10. The discharge controller 22 performs the discharge treatment of the capacitor 6 at a predetermined time such as a time point that the vibration sensor module 1 is powered on, and the electric storage state of the capacitor 6 becomes the discharge state, namely, the state in which the stored energy is emitted to the outside to minimize the electric storage energy. The parameter "discharge frequency" is obtained by cumulatively counting the number of times at each of which the electric storage energy the capacitor 6 becomes the minimum. When the processing in S102 is ended, the flow goes to S103.

In S103, the discharge controller 22 starts the discharge of the capacitor 6 in which the storage voltage is determined to be larger than the discharge threshold. As a result, the electric storage energy of the capacitor 6 decreases and eventually arrives at the discharge state. The discharge controller 22 performs the discharge treatment such that the discharged charge does not move to another capacitor 6 included in the vibration sensor module 1. When the processing in S103 is ended, the flow goes to S104.

In S104, the charge controller 21 switches between the connections of the capacitor 6 to the vibration power generator 4 such that the capacitor to be charged by the generated power of the vibration power generator 4 is switched to another capacitor 6 from the capacitor 6 to which the discharge controller 22 performs the discharge treatment in S103. Therefore, because the generated power of the vibration power generator is stored in the switched capacitor 6 even during the discharge treatment in S103, the vibration energy generated in the bridge 50 can be trapped by the capacitor 6 without omission. When the processing in S104 is ended, the flow goes to S106.

On the other hand, when the negative determination is made in S101, namely, when the storage voltage of the capacitor 6 monitored by the voltage monitor 23 is not determined to be larger than the discharge threshold, the generated power of the vibration power generator 4 continuously charges the capacitor 6 by the processing in S105. At this point, the discharge treatment and the processing of switching between the charge capacitors are not performed. When the processing in S105 is ended, the flow goes to S106.

Whether it is time to transmit the data from the vibration sensor module 1 to the server 10 is determined in S106. In one or more embodiments of the present invention, as described above, the parameter "discharge frequency" is used to detect the vibration energy generated in the bridge 50. Whether it is time to transmit the data of the parameter "discharge frequency" that is of the information on the vibration to the server 10 is determined in S106. Because the relatively large energy is required to transmit the data from the vibration sensor module 1, the time to transmit the data is restricted, and the data is transmitted while collected to some extent, thereby constraining the power consumption. According to one or more embodiments of the present invention, the transmitted data includes the time the discharge frequency is incremented in addition to the numerical value of the discharge frequency. The time the discharge frequency is incremented is included in the transmitted data, which allows the frequency of the discharge treatment to be understood on the side of the server 10. When the affirmative determination is made in S106, the data is transmitted in S107. When the negative determination is made in S106, the data is not transmitted, but the data is accumulated on the side of the vibration sensor module 1 until the next transmission time.

Thus, in the vibration energy detection processing, on the side of the vibration sensor module 1, the power generated by the vibration power generator 4 according to the vibration generated in the bridge 50 is stored once in the capacitor 6, and then the discharge treatment is performed. The discharge frequency that is of the number of discharge treatment times is incremented every time the discharge treatment is performed, and the discharge frequency is properly transmitted onto the side of the server 10. The data concerning the discharge frequency received from the vibration sensor module 1 is processed by the server 10, and the vibration energy generated in the bridge 50 is calculated.

The vibration energy calculation processing on the side of the server 10 will be described with reference to FIG. 5. The vibration energy calculation processing is performed by the calculator 12. In the server 10, the receiver 11 receives the data concerning the discharge frequency from the vibration sensor module 1. The parameter "discharge frequency" means the number of times of the discharge treatment that is performed by the discharge controller 22 when the storage voltage of the capacitor 6 is larger than the discharge threshold, and the number of formation times of the discharge state of the capacitor 6 formed by the discharge treatment. In the discharge state formed by performing the "discharge treatment", the influence of the leakage current characteristic in the capacitor 6 is substantially negligible. Therefore, the technique of calculating the vibration energy based on the "discharge frequency" is said to be the calculation technique in which the influence of the leakage current characteristic in the capacitor 6 is maximally removed.

The energy discharged by the discharge treatment corresponds to the electric storage energy at which the electric storage energy of the capacitor 6 arrives at the discharge threshold. Accordingly, in principle, the vibration energy generated in the bridge 50 is considered to be proportional to total discharge energy in which the discharge energy in the capacitor 6 is multiplied by the discharge frequency. Therefore, in the control map in FIG. 5, the correlation between the discharge frequency and the vibration energy is defined such that the vibration energy increases in proportion to the discharge frequency. The calculator 12 accesses the control map in FIG. 5 based on the received "discharge frequency", which allows the calculation of the vibration energy generated in the bridge 50.

The correlation between the discharge frequency and the vibration energy is defined such that the vibration energy is proportional to the discharge frequency in the control map in FIG. 5. However, the control map does not necessarily have the above proportional relationship from the viewpoint of the position where the vibration sensor module 1 is installed in the bridge 50 or detection result of another vibration sensor module 1. The correlation between the discharge frequency and the vibration energy may properly be set based on various previous experiments.

<First Modification>

In one or more embodiments of the present invention, the number of formation times of the discharge states that are of the electric storage state of the capacitor 6 formed by the discharge treatment of the discharge controller 22 is counted as the discharge frequency, and the discharge frequency is transmitted onto the server 10, which allows the server 10 to calculate the vibration energy generated in the bridge 50 while the leakage current characteristic of the capacitor 6 is removed. Instead of the calculation form in which the discharge frequency is used, even if the vibration energy is calculated based on the number of times of the charge state formed by the arrival of the storage voltage of the capacitor 6 at the discharge threshold, the vibration energy can similarly be calculated while the leakage current characteristic of the capacitor 6 is removed. In the vibration sensor module 1, the discharge controller 22 repeatedly causes discharge of the capacitor 6, and therefore the above charge state is the electric storage state of the capacitor 6 formed through the discharge caused by the discharge controller 22. Accordingly, using the number of formation times of the charge state that is of the number of formation times of the electric storage state, the vibration energy is correctly calculated similarly to the case of using the discharge frequency.

<Second Modification>

As described above, the data concerning the time the discharge frequency is incremented is included in the data transmitted from the vibration sensor module 1 to the server 10, which allows the server 10 to understand the discharge frequency. For example, shortening a time interval of the increment of the discharge frequency means that the discharge frequency increases. In the case that the increase of the discharge frequency at a place where the vibration sensor module 1 is installed in the bridge 50 has a given technical meaning, for example, in the case that it can technically be determined that strength of the bridge 50 is decreased when the discharge frequency is greater than or equal to a predetermined frequency, a user who manages the bridge 50 may be alarmed.

<Third Modification>

In one or more embodiments of the present invention, the plurality of capacitors 6 are installed in the vibration sensor module 1. Alternatively, one capacitor 6 may be included in the vibration sensor module 1. In this case, in the vibration sensor module 1, because the generated power of the vibration power generator 4 is stored in the one capacitor 6, the processing in S104 of the vibration energy detection processing in FIG. 4, namely, the processing of switching between the charge capacitors is not performed. The vibration sensor module 1 including the one capacitor and the vibration sensor module 1 including the plurality of capacitors may be mixed in the vibration energy detection system in FIG. 1.

<Fourth Modification>

In the vibration energy detection system of one or more embodiments of the present invention in FIGS. 1 and 2, the vibration sensor module 1 is provided on the side of the bridge 50, and the data concerning the vibration is collected by the server 10 installed at a site distant from the vibration sensor module 1, thereby detecting the vibration energy. In one or more embodiments of the present invention, the vibration sensor module 1 and the server 10 are separately formed, and the vibration sensor module 1 and the server 10 are connected to each other by wireless communication to form the vibration energy detection system. Alternatively, the power generation of the vibration power generator 4, the charge and discharge of the capacitor 6, and the vibration energy calculation processing based on the discharge frequency may be performed in one apparatus. That is, one or more embodiments of the invention can be understood as a vibration energy detection apparatus. In such a case, the vibration energy data calculated in each vibration energy detection apparatus may be integrated into the server 10 through the base station 7.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 vibration sensor module
2 control device
4 vibration power generator
6 capacitor
10 server
12 calculator
21 charge controller
22 discharge controller
23 voltage monitor
24 discharge frequency detector
50 bridge

The invention claimed is:

1. A vibration energy detection apparatus comprising:
a vibration power generator installed in an inspection object that converts vibration energy generated in the inspection object into power;
an electric storage unit that stores generated power of the vibration power generator;
a voltage monitor that monitors a storage voltage of the electric storage unit;
a discharge controller that discharges electric storage energy of the electric storage unit when the storage voltage of the electric storage unit exceeds a predetermined storage voltage; and
a vibration energy calculator that calculates the vibration energy generated in the inspection object based on the number of formation times of an electric storage state of the electric storage unit,
wherein the electric storage state is continuously or intermittently formed by the discharge by the discharge controller.

2. The vibration energy detection apparatus according to claim 1, wherein the electric storage unit has a predetermined leakage current characteristic that is set based on a power generation frequency and a power generation amount of the vibration power generator.

3. The vibration energy detection apparatus according to claim 1, wherein the vibration energy calculator calculates the vibration energy generated in the inspection object based on the number of formation times of a discharge state formed by discharge by the discharge controller.

4. The vibration energy detection apparatus according to claim 1,
wherein the vibration energy calculator calculates the vibration energy generated in the inspection object based on the number of formation times of a charge state of the electric storage unit, and
wherein the charge state is formed by charging the electric storage unit with the vibration energy after the discharge by the discharge controller and by arrival of the storage voltage of the electric storage unit at the predetermined storage voltage.

5. The vibration energy detection apparatus according to claim 1, comprising:
a plurality of the electric storage units,
wherein the electric storage units are connected in parallel to the vibration power generator such that the generated power of the vibration power generator can be stored in each of the plurality of electric storage units, and
wherein, when one of the plurality of electric storage units is discharged by the discharge controller, the generated power of the vibration power generator is supplied to another electric storage unit except the one of the plurality of electric storage units.

6. A vibration energy detection system comprising:
a sensor module installed in an inspection object that obtains information on vibration applied to the inspection object; and
a server that calculates vibration energy generated in the inspection object based on the information obtained by the sensor module,
wherein the sensor module comprises:
a vibration power generator installed in the inspection object that converts the vibration energy generated in the inspection object into power;
an electric storage unit that stores generated power of the vibration power generator;
a voltage monitor that monitors a storage voltage of the electric storage unit;
a discharge controller that discharges electric storage energy of the electric storage unit when the storage voltage of the electric storage unit exceeds a predeterr lined storage voltage;
a detector that detects the number of formation times of an electric storage state of the electric storage unit,
wherein the electric storage state is continuously or intermittently formed by the discharge by the discharge controller; and
a transmitter transmits data concerning the number of formation times of the electric storage state to the server,
wherein the number of formation times of the electric storage state is detected by the detector, and
wherein the server comprises:
a receiver that receives the data concerning the number of formation times of the electric storage state, the data concerning the number of formation times of the electric storage state being transmitted from the transmitter; and
a vibration energy calculator that calculates the vibration energy generated in the inspection object based on the data concerning the number of formation times of the electric storage state,
wherein the data concerning the electric storage state being received by the receiver.

7. The vibration energy detection system according to claim 6, wherein the electric storage unit has a predetermined leakage current characteristic that is set based on a power generation frequency and a power generation amount of the vibration power generator.

8. The vibration energy detection system according to claim 6, wherein the vibration energy calculator calculates the vibration energy generated in the inspection object based on the number of formation times of a discharge state formed by discharge by the discharge controller.

9. The vibration energy detection system according to claim 6,
wherein the vibration energy calculator calculates the vibration energy generated in the inspection object based on the number of formation times of a charge state of the electric storage unit, and
wherein the charge state is formed by charging the electric storage unit with the vibration energy after the discharge by the discharge controller and by arrival of the storage voltage of the electric storage unit at the predetermined storage voltage.

10. The vibration energy detection system according to claim 6,
  wherein the sensor module comprises a plurality of the electric storage units,
  wherein the plurality of electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

11. The vibration energy detection apparatus according to claim 2, wherein the vibration energy calculator calculates the vibration energy generated in the inspection object based on the number of formation times of a discharge state formed by discharge by the discharge controller.

12. The vibration energy detection apparatus according to claim 2,
  wherein the vibration energy calculator calculates the vibration energy generated in the inspection object based on the number of formation times of a charge state of the electric storage unit, and
  wherein the charge state is formed by charging the electric storage unit with the vibration energy after the discharge by the discharge controller and by arrival of the storage voltage of the electric storage unit at the predetermined storage voltage.

13. The vibration energy detection apparatus according to claim 2, comprising:
  a plurality of the electric storage units,
  wherein the electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

14. The vibration energy detection apparatus according to claim 3, comprising:
  a plurality of the electric storage units,
  wherein the electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

15. The vibration energy detection apparatus according to claim 4, comprising:
  a plurality of the electric storage units,
  wherein the electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

16. The vibration energy detection system according to claim 7, wherein the vibration energy calculator calculates the vibration energy generated in the inspection object based on the number of formation times of a discharge state formed by discharge by the discharge controller.

17. The vibration energy detection system according to claim 7,
  wherein the vibration energy calculator calculates the vibration energy generated in the inspection object based on the number of formation times of a charge state of the electric storage unit, and
  wherein the charge state is formed by charging the electric storage unit with the vibration energy after the discharge by the discharge controller and by arrival of the storage voltage of the electric storage unit at the predetermined storage voltage.

18. The vibration energy detection system according to claim 7,
  wherein the sensor module comprises a plurality of the electric storage units,
  wherein the plurality of electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

19. The vibration energy detection system according to claim 8,
  wherein the sensor module comprises a plurality of the electric storage units,
  wherein the plurality of electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

20. The vibration energy detection system according to claim 9,
  wherein the sensor module comprises a plurality of the electric storage units,
  wherein the plurality of electric storage units are connected in parallel to the vibration power generator such that the generated power of the vibration power generator can be stored in each of the plurality of electric storage units, and
  wherein, when one of the plurality of electric storage units is discharged by the discharge controller, the generated power of the vibration power generator is supplied to another electric storage unit except the one of the plurality of electric storage units.

* * * * *